Patented Jan. 18, 1949

2,459,708

UNITED STATES PATENT OFFICE 2,459,708

DISPERSIONS OF PROTEINS IN AQUEOUS DETERGENTS

Harold P. Lundgren, Berkeley, Calif., assignor to the United States of America as represented by the Secretary of Agriculture No Drawing. Application April 4, 1947, Serial No. 739,353

6 Claims. (Cl. 106—161)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without payment to me of any royalty thereon.

This invention relates to proteins and more particularly to dispersions of proteins in aqueous detergent solutions. These dispersions are useful for preparing artificial films and fibers and may also be used to prepare plastic masses which can be converted by molding into many types of articles such as buttons, trays, container closures, electrical equipment, etc.

An object of this invention is the provision of aqueous dispersions comprising approximately equal parts of a protein and an anionic detergent, i. e., an alkyl aryl sulphonate or alkyl sulphate having detergent properties.

Further objects and advantages will be apparent to those skilled in the art from the disclosure herein.

This application is a continuation-in-part of my application Serial No. 483,496 filed Apr. 17, 1943, and granted as Patent No. 2,425,550, which in turn is a continuation-in-part of my application Serial No. 451,091, filed July 15, 1942, now abandoned.

I have found that artificial films and fibers can be prepared from proteins by the following technique. A protein is dispersed in an aqueous solution of an alkyl aryl sulphonate or alkyl sulphate detergent. In this treatment, molecules of the detergent attach themselves to the protein molecules. A neutral salt is then added to the dispersion to precipitate the protein combined with the detergent. This precipitate is then deformed into a thin article such as a film or fiber and then the article is treated with aqueous acetone or alcohol to extract the detergent leaving an article composed solely of protein. The process of preparing such articles is disclosed and claimed in my co-pending application Serial No. 483,496.

I have also found that in order to prepare a dispersion suitable for preparing films, fibers, and the like, it is essential that the protein and detergent be present in approximately equal parts by weight. Thus if the proportion of protein is increased to about 75% the precipitate, produced when a neutral salt is added, is flocculent. This flocculent precipitate will not cohere and thus cannot be formed into films or fibers. On the other hand if the proportion of protein is decreased to about 25%, the addition of the neutral salt merely causes precipitation of a slimy protein-detergent complex. This slimy material being of low viscosity likewise cannot be formed into films or fibers. However, if the protein and detergent are present in approximately equal proportions by weight then addition of the neutral salt precipitates a protein-detergent complex in the form of a plastic material. This material can be drawn into fibers and films because of its excellent coherence and high plasticity. Although I prefer to use equal parts of protein and detergent, I have found that useful dispersions can be obtained in the range of 40% to 60% protein and 60% to 40% detergent.

The following examples describe particular conditions, techniques, and materials found to be particularly advantageous. It is to be understood that these examples are submitted by way of illustration and not limitation.

*Example 1.*—To one part of egg white powder dissolved in 4.4 parts of water is added 1 part of sodium alkyl aryl sulphonate dissolved in 3.9 parts of water. The mixture after standing at least 24 hours is extruded into saturated $MgSO_4$. The resulting fiber is drawn 100 percent, washed, and partially dried. The protein is regenerated by treatment for 24 hours at room temperature in 60 percent aqueous acetone. The regenerated fiber is drawn in steam 300 to 500 percent to give a highly oriented fiber.

*Example 2.*—To 2 parts of 6–7 percent solution of chicken feather keratin (or wool or hoof keratin) in 0.2 M NaS is added 1½ parts sodium alkyl aryl sulphonate in 5 percent aqueous solution. Add 1 part of saturated $MgSO_4$ or $[NH_4]_2SO_4$ or $Na_2SO_4$. The precipitate is collected, kneaded and rolled to form rods which are immediately pulled into fibers, each rod forming one fiber. After washing in water, the fibers are partially dried and the protein is regenerated by treatment with aqueous acetone or alcohol and drawn according to the procedure described in Example 1.

*Example 3.*—One part of ground oil extracted soybean meal is extracted at 90° centigrade for 2 minutes with 10 parts of 3 percent sodium alkyl aryl sulphonate. The filtered extract is cooled and precipitated with saturated magnesium sulfate. The precipitate is collected, rolled and pulled into fibers as in Example 2. These are partially dried and extracted with 60 percent acetone and drawn in steam to give true fibers.

*Example 4.*—Three parts of pulverized egg white and 3 parts of sodium isopropyl naphthalene sulphonate are dissolved in 100 parts water. Ten parts of saturated magnesium sulfate is added. The resulting precipitate is collected, rolled, and pulled into fibers as in Example 2. The fibers are dried and extracted with 60 percent acetone and drawn in steam to 300 to 500 percent to give highly oriented fibers.

*Example 5.*—Three parts of pulverized dried egg white and three parts of sodium lauryl sulfate are dissolved in 100 parts water. The solution is heated to 90° centigrade for two minutes and is then cooled. Ten parts of saturated magnesium sulfate is added. The resulting precipitate is collected, rolled and pulled into fibers as in Example 2. These are partially dried, extracted with 60 percent acetone and steam drawn 300 to 500 percent to give highly oriented fibers.

*Example 6*—To 1 part sodium alkyl aryl sulfonate (4% in aqueous solution), there is added 1 part egg albumin (4% in aqueous solution). To this mixture ¼ part saturated aqueous solution of sodium, magnesium or ammonium sulphate is added as coagulant. The precipitate is collected in any known manner, such as filtration, centrifugation, etc., kneaded and then may be drawn into fibers or stretched into films.

*Example 7*—To 2 parts 4% aqueous egg albumin solution, there are added 2½ parts sodium alkyl aryl sulphonate or an alkyl naphthyl sulphonate (5% aqueous solution). Precipitate with 1.2 parts saturated magnesium sulphate solution. As soon as possible after precipitation, knead the resulting precipitate into a rod form and pull into fibers.

*Example 8*—Extract commercial zein or soybean protein with 4% sodium alkyl aryl sulphonate solution by heating to 90° for at least 2 minutes. To 5 parts of extract, add ¼ part saturated magnesium sulphate. The resulting precipitate may be pulled into fibers or stretched into films.

*Example 9*—To 2 parts of an 0.1 N acetic acid extract of wheat gluten, add 2 parts of 5% sodium alkyl aryl sulphonate and $\tfrac{1}{10}$ part of triethanolamine xanthate (or $\tfrac{1}{10}$ part monothioglycol). The resulting precipitate may be pulled into fibers. This must be carried out as soon after precipitation as possible.

*Example 10*—To 1 part sodium alkyl aryl sulphonate in 4% aqueous solution, there is added 1 part egg albumin 4% aqueous solution. The resulting solution is concentrated by evaporation to at least ¼ the original volume and the final solution is forced through a spinnerette into a precipitating bath solution ($MgSO_4$ ½–¾ saturated containing appropriate fixing and hardening agents). The filaments are stretched before drying.

Many different proteins can be used to prepare the dispersions. Thus one can use egg albumin, serum albumin, legumelin, leucosin, serum globulin, fibrinogen, myosinogen, edestin, legumin, excelsin, concanavalin, glutenin, and so forth. It is not essential to use pure proteins but one may employ available mixtures containing substantial amounts of these proteins. Thus one can employ soybean meal which has been extracted to remove fatty material, wheat gluten, commercial casein, egg white solids, dried blood, blood fibrinogen, hog thyroglobulin, horn keratin, hoof keratin, chicken keratin, etc.

The detergents which may be used to disperse the protein may be any alkyl aryl sulphonate or alkyl sulphate which has detergent properties. The field of detergents has been developed thoroughly in the last 15 years and almost innumerable series of alkyl aryl sulphonates and alkyl sulphates having detergent properties have been described and/or patented. It has been shown that it is essential that besides the sulphate or sulphonate group (the hydrophilic group) the compound must also contain a high-molecular weight hydrocarbon or other hydrophobic group. There must be a balance between these two opposed groups to give the compound the requisite detergent properties. Thus in the case of the alkyl sulphates and alkyl benzene sulphonates the alkyl radical must possess 8 to 18 carbon atoms. In the case of alkyl naphthalene sulphonates the alkyl group may contain less carbon atoms—down to three are effective. These detergents are generally employed in the form of their salts— i. e., their potassium, sodium, or ammonium salts. Some of the particular detergents which we may use are sodium octyl benzene sulphonate, sodium nonyl benzene sulphonate, sodium decyl benzene sulphonate, sodium undecyl benzene sulphonate, sodium dodecyl benzene sulphonate, sodium tridecyl benzene sulphonate, sodium tetradecyl benzene sulphonate, sodium hexadecyl benzene sulphonate, sodium heptadecyl benzene sulphonate, sodium octadecyl sulphonate, sodium tri (isopropyl) benzene sulphonate, sodium tetra (isopropyl) benzene sulphonate, sodium di (isobutyl) benzene sulphonate, sodium tri (isobutyl) benzene sulphonate, sodium tetra (isobutyl) benzene sulphonate, any of the above named compounds in the form of their potassium or ammonium salts, sodium isopropyl naphthalene sulphonate, sodium di (isopropyl) naphthalene sulphonate, sodium tri (isopropyl) naphthalene sulphonate, sodium isoamyl naphthalene sulphonate, sodium di (isoamyl) naphthalene sulphonate, sodium isobutyl naphthalene sulphonate, sodium di (isobutyl) naphthalene sulphonate, sodium tri (isobutyl) naphthalene sulphonate, sodium octyl naphthalene sulphonate, sodium decyl naphthalene sulphonate, or any of the above named alkyl naphthalene sulphonates in the form of their potassium or ammonium salts, sodium octyl sulphate, sodium nonyl sulphate, sodium decyl sulphate, sodium undecyl sulphate, sodium dodecyl sulphate, sodium tridecyl sulphate, sodium tetradecyl sulphate, sodium pentadecyl sulphate, sodium cetyl sulphate, sodium heptadecyl sulphate, sodium octadecyl sulphate, sodium 2-pentadecyl sulphate, sodium oleyl sulphate, and any of the above named alkyl sulphates in the form of their potassium or ammonium salts. It has been found that many of the alkyl aryl sulphonate and alkyl sulphate detergents available in commerce are well suited for use in preparing the dispersions. For instance the sodium alkyl benzene sulphate where the alkyl is between $C_{12}$ and $C_{18}$ is suitable. This detergent is prepared by condensation of chlorinated kerosene with benzene and sulphonation of the resulting alkylated benzene. Other commercially available detergents which are suitable are sodium decyl benzene sulphonate, sodium dodecyl benzene sulphonate, alkylated monosodium benzene sulphonate containing several alkyl groups totaling 10 carbon atoms, a mixture of sodium alkyl sulphates consisting mostly of sodium lauryl sulphate, etc. Thus I can use any alkyl aryl sulphonate or alkyl sulphate which has detergent properties.

Having thus described my invention, I claim:

1. A composition consisting essentially of an aqueous dispersion of approximately equal parts by weight of a protein and a detergent selected from the group consisting of alkyl aryl sulphonates and alkyl sulphates.

2. A composition consisting essentially of an aqueous dispersion of approximately equal parts by weight of a protein and an alkyl aryl sulphonate detergent.

3. A composition consisting essentially of an aqueous dispersion of approximately equal parts by weight of a protein and an alkyl sulphate detergent.

4. A composition consisting essentially of an aqueous dispersion of substantially equal parts of egg white solids and sodium isopropyl naphthalene sulphonate.

5. A composition consisting essentially of an aqueous dispersion of substantially equal parts by weight of egg white solids and sodium lauryl sulphate.

6. A composition consisting essentially of an aqueous dispersion of substantially equal parts by weight of feather keratin and an alkyl aryl sulphonate detergent.

HAROLD P. LUNDGREN.

REFERENCES CITED

The following references are of record in the file of this patent:

UNITED STATES PATENTS

| Number | Name | Date |
|---|---|---|
| 2,403,251 | Watson | July 2, 1946 |

OTHER REFERENCES

Protein Plastics and Fibers—part II—Spinner—British Plastics—August 1946.